United States Patent Office 3,289,640
Patented Dec. 6, 1966

3,289,640
INK CONDUCTOR FOR FOUNTAIN PENS
Ernst Rösler, Hamburg, and Konrad Kressel, Hamburg-Poppenbuttel, Germany, assignors to Montblanc-Simplo G.m.b.H., Hamburg, Germany
Filed May 27, 1965, Ser. No. 465,819
Claims priority, application Germany, Dec. 22, 1956, M 32,760; Nov. 7, 1957, M 35,846
11 Claims. (Cl. 120—50)

This application is a continuation-in-part of U.S. patent application, Serial No. 249,968, filed December 19, 1962, now abandoned which, in turn, is a continuation-in-part of U.S. patent application, Serial No. 703,152 filed December 16, 1957, now abandoned.

The present invention relates to an ink conductor for fountain pens and more specifically concerns such an ink conductor which comprises a shank portion and a tongue portion, provided with capillary ducts adapted for the flow of ink therethrough, air passages for air pressure compensation when ink is withdrawn during use of the pen, and ink retaining slots formed by ribs in the tongue.

In the construction of fountain pens it is known to provide ink conductors consisting of shank and tongue portions, the former fitting into the sleeve or barrel of the pen, and the latter extending forward therefrom and being closely positioned adjacent and below the nib of the pen. It is also known to provide in the ink conductor capillary passages or ducts for feeding the ink, and also to provide therein air passages to supply air to the ink reservoir to provide for pressure compensation. Moreover, it is known that the ink conductor may be provided with ribs which extend laterally to a longitudinal supporting web, the ribs forming slots transverse to the longitudinal axis of the ink conductor and forming pockets for receiving excess ink in order to prevent the fountain pen from releasing the ink too rapidly so as to flood the nib of the pen and introduce the possibility of forming ink blots.

Also it is known to so construct the ink conductor that the slots therein open into a shallow passageway below the nib of the pen. It is furthermore known to design the ink conductor in such a way as to be resilient and to rest in engagement with the lower surface of the nib of the pen.

In providing for the admission of air into the ink reservoir of the pen and the withdrawal of ink therefrom, it has been proposed to provide two simple ducts, one for ink and the other for air. In this connection reference may be had to the Hyde Patent No. 426,021. Arrangements of this sort work reasonably well as long as the pen is held in writing position but do not overcome the tendency of ink to be discharged from the pen when the latter is in other positions and expansion of the air in the ink reservoir occurs by reason, for example, of temperature changes.

It has been attempted to solve the problem of air expansion by providing a space or spaces in the ink conductor that will take up excess ink forced out of the ink reservoir. The patent to Klagges, No. 2,292,381 and to Randolph, Patent No. 2,645,205, are examples of modifications in this direction. Ink flooding is a subject of concern in the patent to Tonkowich, No. 2,770,221 wherein the attempt is made to solve the same problem by the provisions of feedback passages in the ink conductor. While the designs described in these prior descriptions have utility, however, they leave considerable opportunity for improvement.

It is an object of the present invention to provide an improved ink conductor for fountain pens in which effective air pressure compensation will be assured under all atmospheric conditions so that a uniform, dependable and trouble-free ink flow always will be obtained.

Another object of this invention is to provide an improved ink conductor for fountain pens which is so constructed as to prevent the ink thread extending from the ink reservoir to the writing nib from breaking during the writing operation and which, at the same time, will assure that the tongue end of the ink conductor will follow all movements of the nib of the pen, not only when using hard pen nibs, but also when using very soft elastic pen nibs.

It is a further object of the present invention to provide an ink conductor for fountain pens which, for all practical purposes, will prevent the capillary slit in the ink conductor from drying out at any time.

These and other objects and advantages of the invention will appear more clearly from the following specification when considered together with the accompanying drawings, in which.

*General arrangement*

The ink conductor according to the present invention is characterized in that the ink conductor comprises an elastic tongue portion which extends forward from the ink conductor shank and which is closely spaced to the undersurface of the nib of the pen and is split by a longitudinal capillary slit. The front end of the tongue resiliently engages the tip of the nib from below.

According to a particularly advantageous embodiment of the invention, the front end of the tongue is provided with an ink depression or cavity which is intersected by the capillary slit, the cavity being located under the tip of the nib. The tongue comprises downwardly cut slots which divide the tongue of the pen into a series of ribs. The ribs extend to an integral transverse web portion. The upper edges of the ribs extend in a plane substantially parallel to the underside of the nib and in spaced relationship thereto, thus forming a longitudinally extending air passageway. Expediently, the capillary slit is widened at certain parts of its length to form a non-capillary groove.

According to a preferred embodiment, the capillary slit for the conduction of ink leads from the ink reservoir of the fountain pen to the front end of the tongue. The ink flow according to this embodiment takes place through the lower portion of the ink conductor, and the flow of air takes place through an air passageway formed between the upper edges of the ribs and the nib of the pen, toward the rear through a widened groove or air passage, thence into an annular groove around the periphery of the shank, for passage of air therein downwardly and ultimately through a widened passage into the ink reservoir, the air being admitted through the thread of the ink in the form of minute bubbles. In other words, the flow of air crosses the path of ink flow and thence enters the ink reservoir within the barrel of the pen. Moreover the air bubbles pass through a widened ink passageway which broadens rearwardly from the capillary slit into the ink reservoir.

For certain purposes it has been found advantageous if the capillary slit is cut into the rib portions of the tongue only, and does not extend through the underlying resilient web portion.

According to a further development of the invention, the air passageway does not inter-connect with an annular groove but extends rearwardly into a widened passageway for ink outflow and air inflow and opens into the ink reservoir in the upper portion thereof.

According to a preferred embodiment of the invention, the rear portion of the capillary slit has an arched portion which opens into the ink reservoir, at the same time in this proximate vicinity interconnecting with a rear widening noncapillary portion as aforesaid. That portion of the ink conductor slits and passageway which intersect at the zone of crossing of the paths of ink flow and air admission constitutes the flow control section of the pen.

*Structural Arrangement*

Figures 1, 2, 5:
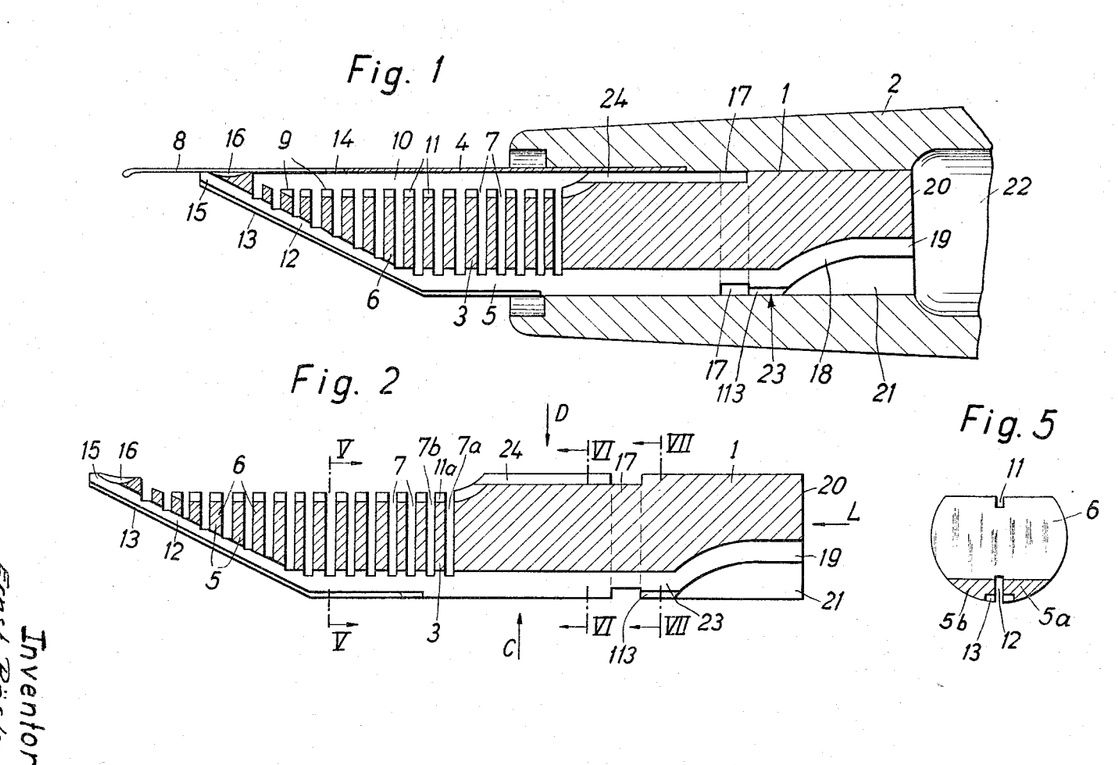
FIG. 1 is a longitudinal section through an ink conductor according to the present invention, the conductor being mounted in normal position in a fountain pen, said section being taken along line I—I of FIG. 3.
FIG. 2 is a section similar to that of FIG. 1 but with the nib and barrel of the fountain pen removed therefrom.
FIG. 5 is a transverse section taken through the ink conductor of FIG. 2 along the line V—V thereof.
Figures 3, 4:
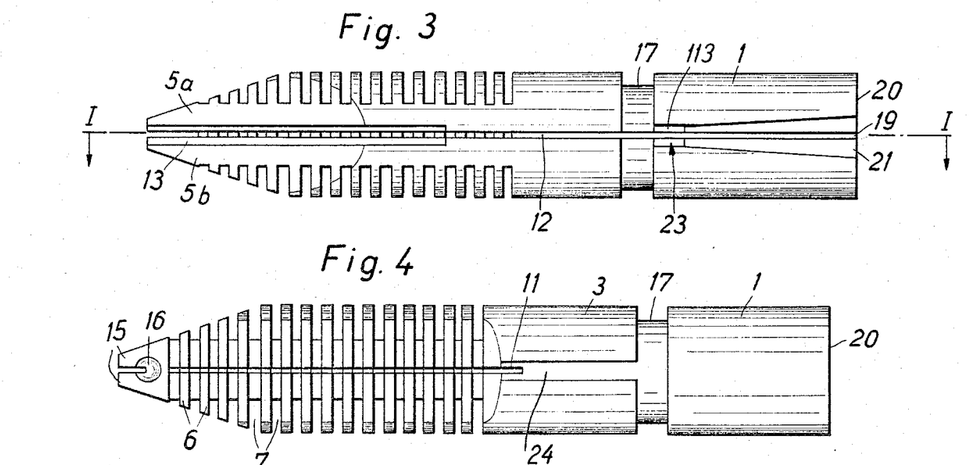
FIG. 3 is a view of the ink conductor shown in FIG. 2 seen in the direction of arrow C.
FIG. 4 is a top view of the ink conductor shown in FIG. 2 seen in the direction of arrow D.

Referring now to the drawings in detail, and to FIG. 1 in particular, the ink conductor illustrated therein comprises an ink conductor shank portion 1, cylindrical in cross-section, or substantially so, which shank is shown as inserted in the front end of a sleeve or barrel 2 of a fountain pen or in an ink conductor bushing (not shown) in said sleeve. The ink conductor extends forwardly of the shank portion 1 to form a tongue portion 3. The latter has a supporting part in the form of a generally flat surface or web 5 which extends along the lower portion of tongue 3 and thence inclines upwardly to terminate approximately at the tip 8 of the pen nib 4. Integral with said web and extending upwardly there are a series of ribs 6 perpendicular to the longitudinal axis of the ink conductor 1, which ribs form slots 7 for receiving ink. The ribs 6 which have a width approximately equal to that of the width of the pen nib 4 are so proportioned and positioned that their upper edges 9 are substantially equispaced with respect to the undersurface of the nib 4, thereby forming a longitudinally extending free air space 10 between the under-surface of the nib 4 and the upper edges 9 of the ribs 6. A capillary slit 11 extends directly into said ribs 6 and throughout the series thereof, the slit being vertical and extending through the longitudinal axis of the ink conductor. In event of the flow of an excess quantity of ink from the ink reservoir 22, the ink excess reaching the forward part of the ink conductor will gather in the slots 7 in sequence, as indicated in FIG. 2 by reference numerals 7a, 7b, etc. In other words, the ink will fill one slot and then overflow into an adjacent slot. Web 5 is provided with longitudinally extending capillary slit 12 which extends into the shank 1.

The two capillary slots 11 and 12 subdivide the tongue section into two sections 5a and 5b. The upper capillary slot 11 which intersects the majority of all vertical ribs 6 of the ink conductor communicates with air chamber 10, which, as will be evident from FIG. 5, is open toward the side. The upper capillary slot 11 is confined toward the front and toward the rear by the engagement of pen 4 with the tip 15 of the ink conductor and by engagement of pen 4 on the shank portion of the ink conductor.

Capillary slot 11 transversing ribs 6 brings about that, when a larger quantity of ink should through annular groove 17 have passed through air passage 24, the ink excess flowing into the trough-shaped air chamber 10 will first pass into pocket 7a and when overflowing will be passed through capillary slot 11a of rib 8a into the adjacent pocket 7b, etc.

The non-capillary groove 13 has an important function inasmuch as when putting down the fountain pen it prevents the capillary groove 11 thereabove from contacting the surface upon which the fountain pen has been placed. If such contact were allowed, the capillary slot, similar to a wick, would continuously draw ink from the ink chamber, and the said surface upon which the fountain pen had been placed would be soiled.

Capillary slot 11 which intersects all vertical ribs 6 of the ink conductor in its upper free-standing part serves the purpose of preventing an unusual quantity of ink which could pass through annular groove 17 and air passage 24 from entering air chamber 10 but permits said quantity of ink successively to flow into pockets 7a, 7b, etc. for instance when travelling by plane where the level and air pressure can change quickly.

The ink conductor has a control region, designated 23 and in this region is located groove 17 and air passage 113 which is adjacent slot 12 and serves for conveying air.

As to the pressure equalization for the ink container, the air on its way from annular passage 17 through wedge-shaped broadened section 21 passes through air passage 113. This equalization air cannot pass through capillary 12, 18, 19 which is continuously filled with ink.

Air passage 113 is so dimensioned that the air equalization from the atmosphere into the container is controlled via said control section or region 23. When ink is withdrawn, a vacuum is formed in the container which is relieved through control section 23 by a quantity of air corresponding to the quantity of withdrawn ink.

An ink depression or cavity 16 is arranged in the tongue 3, specifically in the forward end 15 thereof, between the tip 8 and the aperture 14 in the nib. Ink depression 16 is intersected by the capillary slit 12 being thereby supplied and maintained in operative condition. Front end 15 of tongue 3 rests under load i.e. resiliently, against the undersurface of the tip 8 of the nib 4 in such a manner that the tongue 3 will resiliently follow through normal movements such as those caused by bending of pen nib 4.

Capillary slit 12 extends to the rear through ink conductor shank 1 through and beyond annular groove 17 (FIGS. 1 to 9) into an arched portion 18. The latter opens at its end 19 through a slit of capillary size 19 in the face 20 of shank 1. Below the arched portion 18 of capillary slit 12, there is an ink passageway 21 which widens to the rear (FIG. 8) and thence into the ink reservoir 22. Capillary slit 12 further opens into ink passageway 21 (FIG. 8). This arrangement provides a means of controlling the relative flow of ink and air as will be further explained hereinafter.

Figure 6:
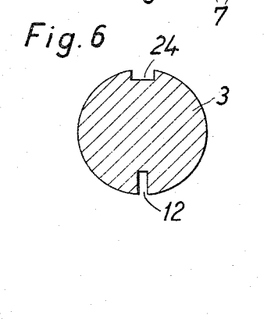
FIG. 6 is a transverse section through the ink conductor of FIG. 2 taken along the line VI—VI thereof.
Figure 7:
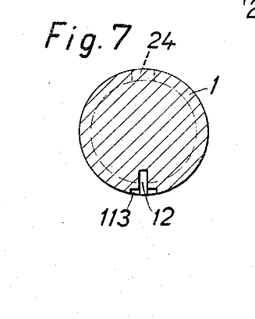
FIG. 7 is another transverse section of the ink conductor of FIG. 2 taken along the line VII—VII.
Figure 8:
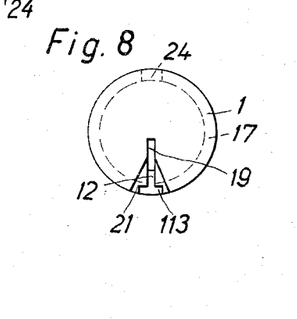
FIG. 8 is an end view of the ink conductor shown in FIG. 2 seen in the direction of arrow L.

With respect now to the passage of air into reservoir 22 for the purpose of compensating for loss in the volume of ink therefrom, it will be understood that, occasioned by a slight differential in pressure within reservoir 22, air may be forced by outer or atmospheric pressure through the longitudinally extending free air space 10 rearwardly into air passage 24 which, as may be seen in FIGS. 6, 7 and 8, is wider than the capillary slit 11, i.e. is of non-capillary proportions. Air passage 24 inter-connects with annular groove 17 which permits air to enter directly through the flow of ink and pass in counter-current thereto into ink passageway 21 and thence into reservoir 22. Thus the ink and the air forwardly of annular groove 17 are conducted part way in separate paths. But by means of annular groove 17 the indrawn air encounters and enters the ink at control passage 23 and moves in counter-current flow thereto through the ink passageway 21, the latter conically widening toward the rear as to width and depth.

Figures 18, 19:
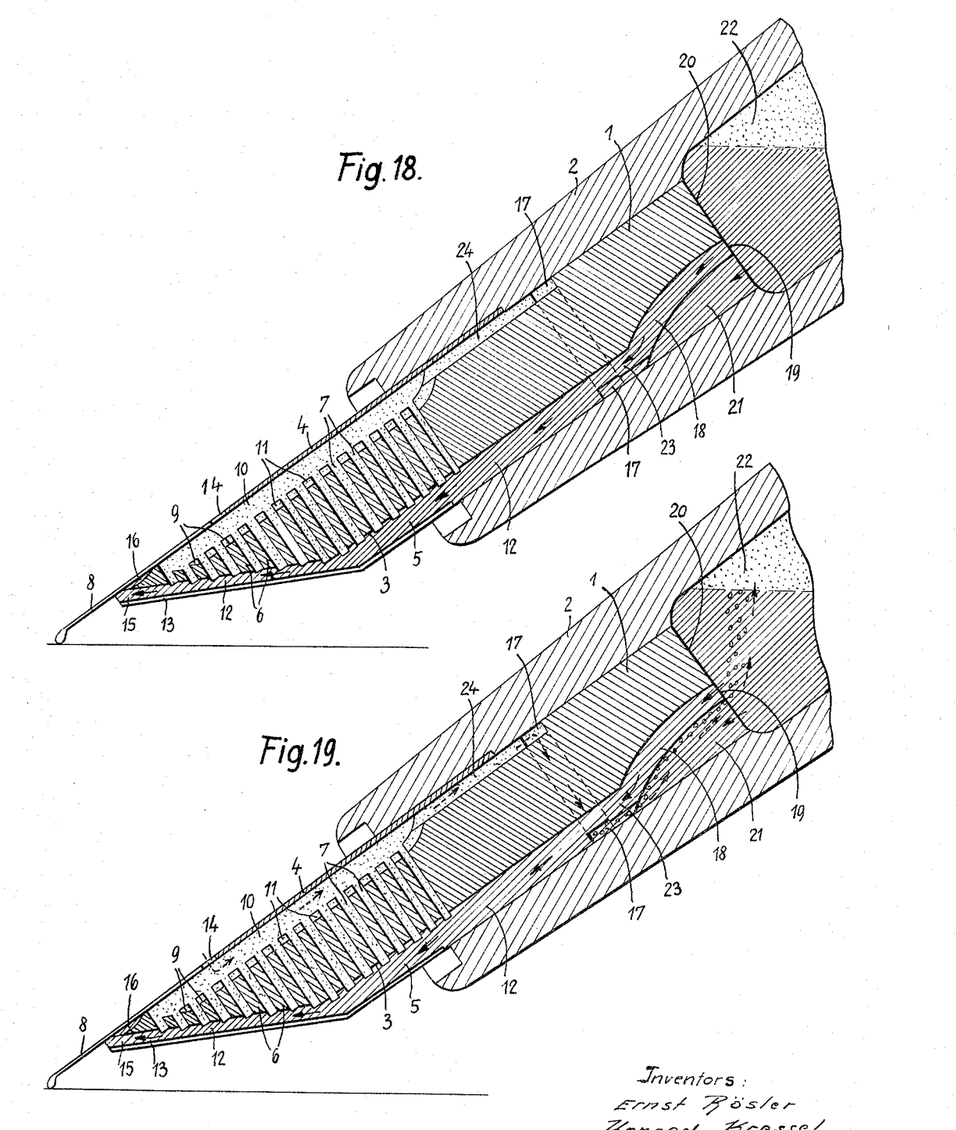
FIGS. 18 to 22 are enlarged sectional views showing the operation of the pen of the present invention.

In FIG. 18 there is shown the construction according to the present invention where the pen may be considered as being in writing position. In this position the ink shown by section lines feeds partly by gravity and partly by capillary action from chamber or reservoir 22 through capillary passage 19, thence through control passage 23, continuing through capillary slit 12 to the end of the nib where there is provided a small cavity 16. As the ink empties from the reservoir, there will be created a slight vacuum, and as a matter of fact, if this continued, the ink would be unable to flow. However, in accordance with the present construction, air is fed back into the chamber or reservoir as shown in FIG. 19. In this figure of drawing the air which is delineated by stippling, enters aperture 14, passes back through free space 10, into air passage 24, thence into annular groove 17, proceeding therearound into the vicinity of control passage 23.

The air then proceeds to enter the widened ink passageway 21 in the form of small bubbles, whence it enters the ink chamber and rises through the ink therein into the space above.

Figures 20, 21:
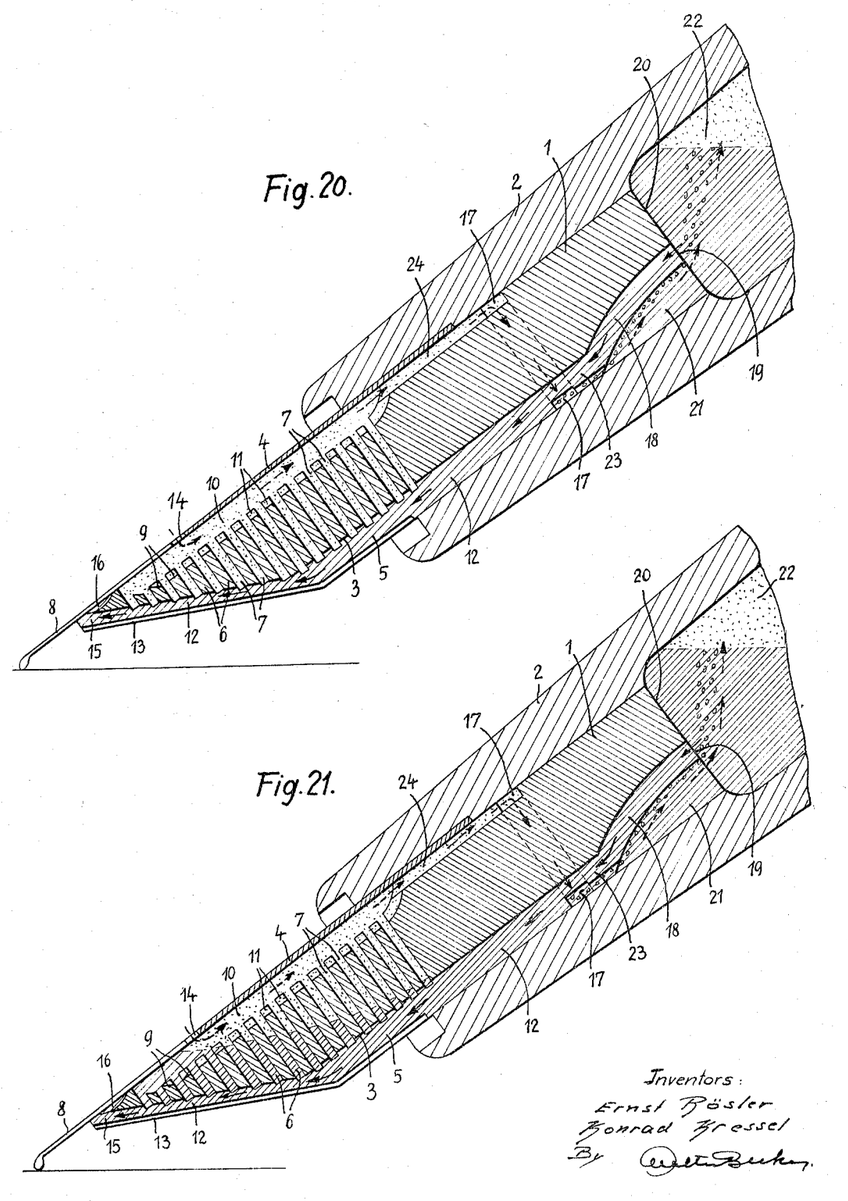

By reference to FIG. 20, the concurrent action of the ink and the air is shown. In this it will be noted that as air bubbles enter the lower part of groove 17, they pass in counter-flow through the ink which is entering passage 21. The ink in this vicinity is drawn through capillary slit portion 18 by virtue of capillary action, but the air bubbles preferentially enter the widened passageway 21 which flares back in a funnel-like manner, as may perhaps best be observed by reference to the original figures of drawing, FIG. 3 and FIG. 8.

In FIG. 21 there is shown an occurrence where an excess amount of ink has been fed forward into the tongue portion. In this event, the pockets or slots 7 are filled up one by one, thus preventing blotting of the ink on the paper. Manifestly this ink which is taken up by the slots is ultimately withdrawn by capillary action when the condition of equilibrium of pressures is restored.

Figure 22:
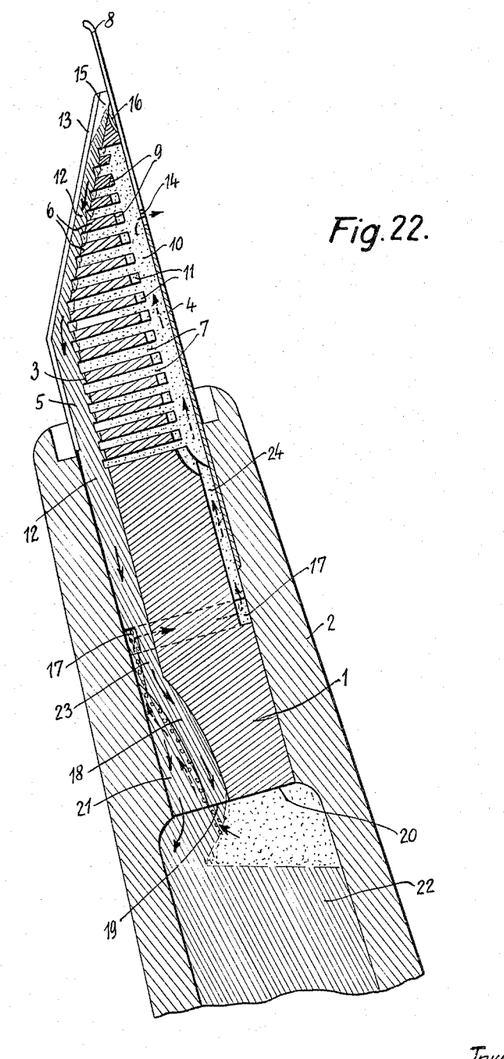

FIG. 22 shows the function of the pen when it is oriented with the tip up as it would be in the case of storage in the pocket of the owner. In this case the air returns through passageway 21, annular groove 17, air passage 24, free space 10, and thence through aperture 14, again in counter-current flow against the direction of the ink.

It follows also from the foregoing construction that if, while the fountain pen is in its resting position, i.e., is maintained with its point upward, it happens that the volume of ar is expanded in the reservoir 22, a pressure will be built up therein whereby the air will be forced out without expulsion of any loss of ink. It will be understood that expansion and contraction of air may occur in various ways as by contact of the pen with the hand of the writer or by atmospheric temperature changes, or by pressure changes in the case of the pen being carried when ascending or descending in an airplane.

The contact of the front end 15 of web 5 together with ink cavity 16 resiliently resting under load against and below tip 8 of said pen insures that the tongue of the pen normally follows the movements of the nib 4 and the ink conductor may accordingly be employed whether with hard or very soft elastic pen nibs.

Furthermore, the pen cannot dry out and cannot cause attendant difficulties for the reason that the ink depression 16 with the ink therein communicates with capillary slit 12 thereby supplying a small but sufficiently constant quantity of ink.

Figure 9:
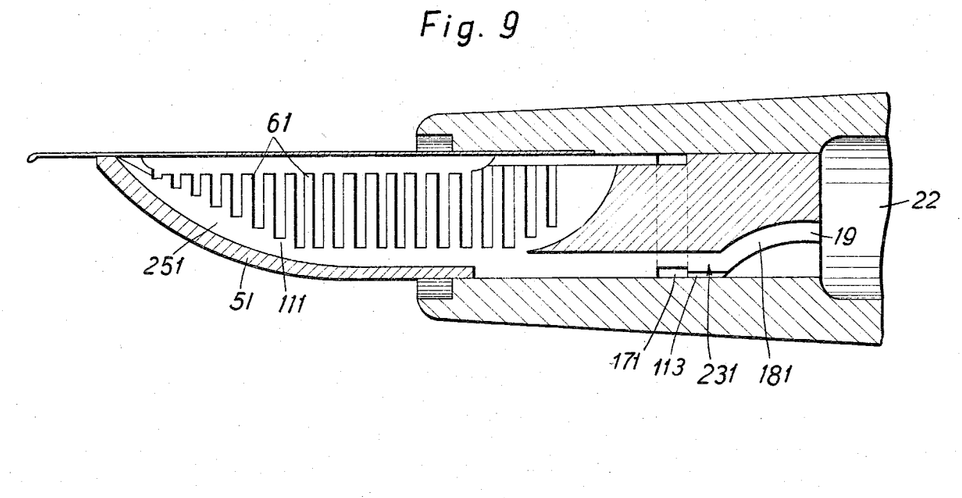
FIG. 9 is a vertical section taken through another embodiment of an ink conductor according to the present invention, the ink conductor being shown mounted in the barrel of the pen and together with a nib portion.

As will be evident from FIG. 9, which represents a desirable modification of the invention, capillary slit 111 may be extended through ribs 61 but not through web 51 whereby the inner surface of web 51 forms an auxiliary reservoir which absorbs the hydrostatic pressure of the ink downwardly and forms a storage chamber therefor. Closed passageway 251 extends rearwardly to the control zone 171, 231, and thence into an arched portion 181 entering the reservoir 22 at point 191.

Figure 10:
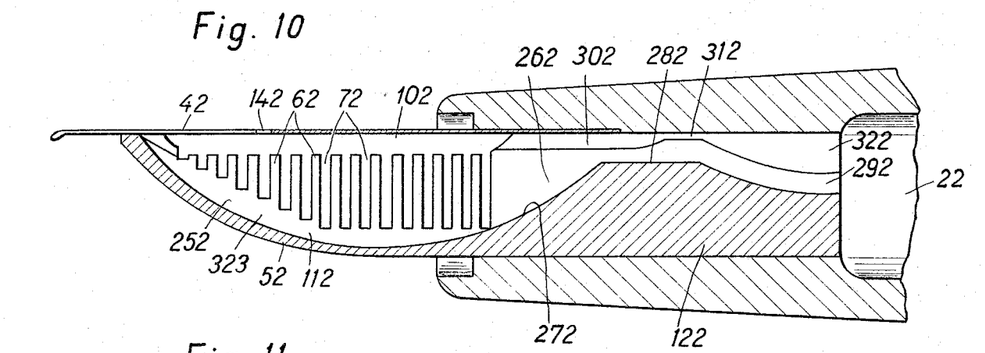
FIG. 10 is a vertical sectional view of still another embodiment of an ink conductor according to the present invention, the section being taken along the line X—X of FIG. 12.
Figure 11:
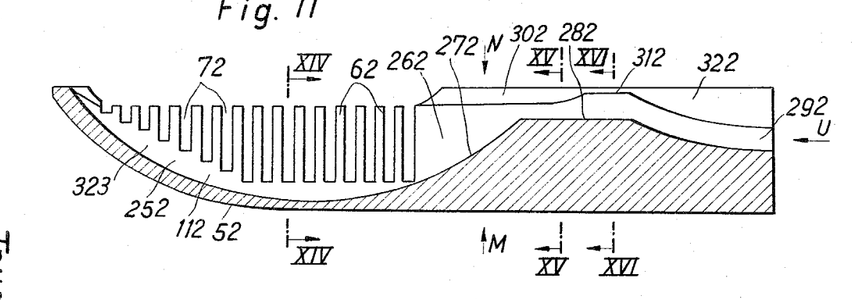
FIG. 11 is a vertical section similar to that of FIG. 10 with the barrel of the pen and the nib thereof removed.
Figure 12:
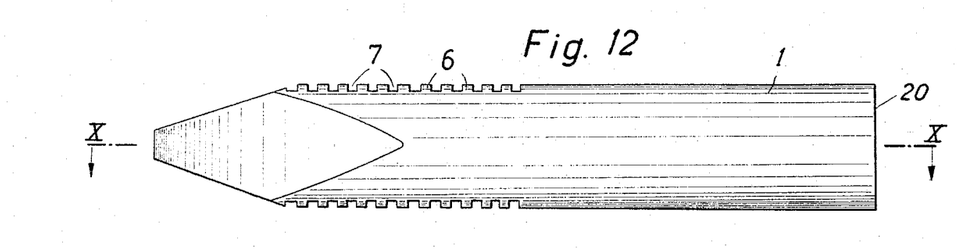
FIG. 12 is a view of the ink conductor of FIG. 11 seen in the direction of the arrow M of FIG. 11.
Figure 13:
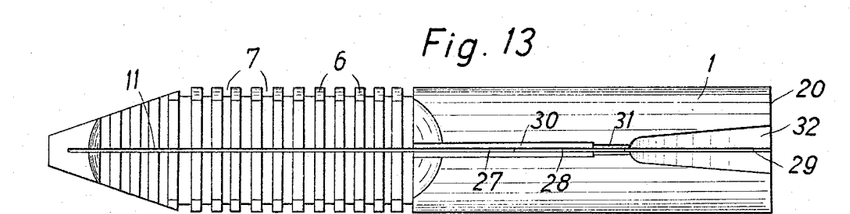
FIG. 13 is a top view of the ink conductor of FIG. 11 seen in the direction of arrow N thereof.
Figure 14:
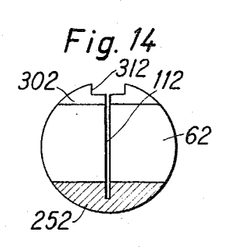
FIG. 14 is a transverse section taken through the ink conductor shown in FIG. 11 and taken along the line XIV–XIV thereof.
Figure 15:
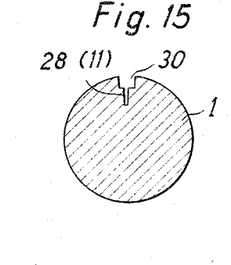
FIG. 15 is a transverse section through the ink conductor of FIG. 11 taken along the line XV—XV thereof.
Figure 16:
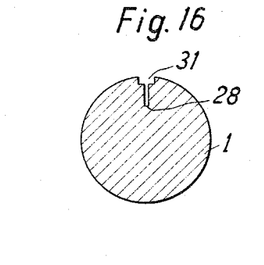
FIG. 16 is a transverse section taken through the ink conductor of FIG. 11 along the line XVI—XVI thereof.
Figure 17:
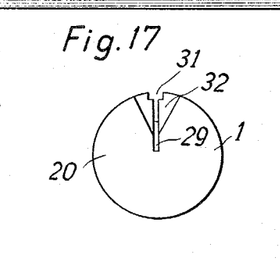
FIG. 17 is an end view of the ink conductor corresponding to FIGS. 10 to 13 and taken in the direction of the arrow U, FIG. 11.

The embodiment shown in FIGS. 10, 11 and 14 differs from that of FIGS. 1 to 9, in that no annular groove 17 is provided. Furthermore, the rear wall 272 of space 252 curves upwardly into the shank 122, forming a passage 262 leading to a control section 282, 312. From the latter there extends a passage 322 which widens to the rear (FIG. 17) until it opens into ink reservoir 22. A broadened air passageway 302 is shown interconnecting the control passageway 312 with the air passageway 102. This latter broadened air passageway narrows down in width and height at the control portion 282 to form the control passage 312, which latter widens into air inlet 322, which opens into reservoir 22.

When the fountain pen is in writing position, ink from reservoir 22 passes through inlet slit 292 through control passage 282, arched portion 272 into capillary slit 112 which intersects the ribs centrally. To the extent to which ink is fed, air passes through the aperture 142 of the nib 42 through the passageway 102, broad passageway 302, control section 312, thence into widened passageway 322 and into the reservoir 22. Within the control section of the pen the air bubbles must find their way through the counter-flowing ink in passageway 322 so that the air in the form of a continuous succession of pearl-like bubbles passes into passageway 322. The control of ink flow in this instance is effected in the same manner as described in connection with FIGS. 1 through 9, the only exception being that in accordance with this embodiment of the invention, the capillary slit 112 feeding the ink and the air inlet passageway 102, control section 312, and air inlet passageway 302 are located in the upper portion of the rib-free shank portion 122 aligned on top of each other and that the air passageway 102 conveying the air is located in the upper portion of the ribbed portion 323 so that the air passageway 302 is located substantially in the rib-free portion 122 whereby the annular groove 17 becomes superfluous. The capillary slit 112 with its portions 272, 282 and 292 extends from the air passageway 302 to a certain extent downwardly and centrally into the rib-free shank portion 122.

The pen-like shape of web 52 has the advantage that the ink, namely the ink supply in space 252 and between ribs 62, is thoroughly protected against drying out. During the outflow of ink from slots 72 when the fountain pen is turned point uppermost, as in interruption in the writing operation, the drainage of ink back into reservoir 22 is effected quickly. Furthermore, when the intermission between writing may be prolonged and the pen with the cap not applied lies in a horizontal position, little or no evaporation of the ink supply in slots 72 and no concentration of the ink will occur which could lead to the deposit of insoluble precipitates that could bring about an encrusting of the ink conductor. Thus, the danger of clogging with the fountain pen according to the present invention is greatly diminished over that of previously known ink conductors. The arrangement of space 252 additionally brings about the desirable result that the slots 72 are evenly filled with ink. Furthermore, experience has shown that the ink flow is effected in a more uniform and effective manner because with the resultant forces occurring during the ink flow within the fountain pen, the components directed downwardly are absorbed in the said closed space 252 and that component only which extends parallel to the lower edge of the writing pen becomes effective. Furthermore, any danger of ink drippage from the ink conductor, if a large quantity is collected, will be safely avoided by the ink conductor according to the present invention.

The ink conductor according to the present invention may be made of any suitable material which has the necessary resiliency, such as hard rubber, synthetic rubber, as for instance vinyl polymers or mixed polymers of superpolyamides, acrylic acid derivatives, styrol compounds, polybutadiene or the like. The ink conductor may be produced by chip-removing, or by non-chip-removing molding as for instance by pressing, spraying, casting or the like.

It is, of course, to be understood that the present invention is by no means limited to the exact constructions shown in the drawings but also comprises any modifications within the scope of the appended claims.

What is claimed is:

1. In combination with a fountain pen having an ink reservoir and a nib; an ink conductor comprising a shank portion disposed in one end of said reservoir and a tongue portion disposed beneath said nib, said ink conductor being provided on the side opposite said nib with a capillary slit extending longitudinally therein from said ink reservoir along said shank portion and tongue portion to the outer end of said tongue portion, said tongue portion on the side thereof toward said nib being provided with an air space larger than capillary size, said tongue comprising alternate transverse ribs and slots with the slots communicating with said slit and said space, said capillary slit on the end portion toward the reservoir widening into a region wider than capillary and communicating the slit with the reservoir, and passage means larger than capillary connecting said air space with said region and including a portion adjacent said slit and forming a control section for controlling the flow of ink and air to and from said reservoir.

2. In combination with a fountain pen having an ink reservoir and a nib; an ink conductor comprising a shank portion disposed in one end of said reservoir and a tongue portion disposed beneath said nib, said ink conductor being provided on the side opposite said nib with a capillary slit extending longitudinally therein from said ink reservoir along said shank portion and tongue portion to the outer end of said tongue portion, said tongue portion on the side thereof toward said nib being provided with an air space larger than capillary size, said tongue comprising alternate transverse ribs and slots with the slots communicating with said slit and said space, said capillary slit on the end portion toward the reservoir widening into a region wider than capillary and communicating the slit with the reservoir, an annular passage larger than capillary size in cross section in said shank portion connecting said air space with said slit forwardly of the juncture of said slit and said region, and passage means communicating with said slit and leading from said annular passage to said region, said passage means being larger than capillary size and forming a control section for controlling the flow of ink and air to and from said reservoir.

3. The combination according to claim 1 wherein said slots of said tongue portion extend into said tongue portion to a sufficient depth to render said tongue portion flexible.

4. The combination according to claim 1 wherein the lower part of said capillary slit communicates with a space located on and extending along the lower portion of said tongue portion and larger than capillary in size.

5. The combination according to claim 1 wherein said capillary slit and said reservoir are interconnected by a capillary slit portion having an arcuate shape.

6. The combination according to claim 1 wherein said slots of said tongue portion extend into said tongue portion to a distance comprising the major part of the cross-sectional dimension of said tongue portion.

7. The combination according to claim 1, wherein said nib engages said conductor at two spaced points only in such manner as to provide between the front end and rear end of said ink conductor a free air space.

8. The combination according to claim 1, wherein said air space communicates directly with said slots.

9. The combination according to claim 1 wherein the entire ink conductor is elastic.

10. In combination with the fountain pen having a barrel forming an ink reservoir and open at one end and having a nib portion with one end disposed in said opening; an ink conductor comprising a shank portion disposed in said one end of the barrel together with one end of said nib and also comprising a tongue portion disposed beneath the portion of the nib which projects from said barrel, said ink conductor on the bottom having capillary slit extending the full length thereof, said tongue portion on the side toward the nib being provided with an air space of dimensions larger than capillary size, a plurality of spaced transverse slots formed in the tongue portion communicating with said slit and said air space and of capillary dimensions in cross section, a passage of dimensions larger than capillary in said shank connecting the air space with said slit, said slit widening rearwardly of said passage to the back end of the shank, and a region formed in the shank between the forward end of said widening portion and said passage of dimensions larger than capillary.

11. The combination according to claim 10 in which a groove of dimensions larger than capillary is formed in the bottom of the tongue portion communicating with said slit to prevent flow of ink from said slit to a surface engaged by the bottom of the tongue portion.

References Cited by the Examiner

UNITED STATES PATENTS

| | | | |
|---|---|---|---|
| 1,853,731 | 4/1932 | Kovacs | 120—50 |
| 2,282,840 | 5/1942 | Wing | 120—50 |
| 2,292,381 | 8/1942 | Klagges | 120—50 |
| 2,645,205 | 7/1953 | Randolph | 120—50 |
| 2,756,722 | 7/1956 | Lamy | 120—50 X |
| 2,770,221 | 11/1956 | Tonkowich | 120—59 |

FOREIGN PATENTS

| | | |
|---|---|---|
| 708,633 | 5/1954 | Great Britain. |

EUGENE R. CAPOZIO, *Primary Examiner.*

H. F. ROSS, *Examiner.*